(12) United States Patent
Escobar et al.

(10) Patent No.: US 11,180,188 B2
(45) Date of Patent: Nov. 23, 2021

(54) VEHICLE STEERING ASSEMBLY

(71) Applicant: Nissan North America, Inc., Franklin, TN (US)

(72) Inventors: Martin Escobar, Mexico City (MX); Victor Meneses, Mexico City (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 78 days.

(21) Appl. No.: 16/694,634

(22) Filed: Nov. 25, 2019

(65) Prior Publication Data
US 2021/0156417 A1    May 27, 2021

(51) Int. Cl.
| | |
|---|---|
| *B62D 5/22* | (2006.01) |
| *F16C 11/06* | (2006.01) |
| *B62D 3/12* | (2006.01) |
| *B62D 5/30* | (2006.01) |
| *B62D 7/16* | (2006.01) |

(52) U.S. Cl.
CPC ............... *B62D 5/22* (2013.01); *B62D 3/12* (2013.01); *B62D 5/30* (2013.01); *B62D 7/16* (2013.01); *F16C 11/0666* (2013.01); *F16C 2326/24* (2013.01)

(58) Field of Classification Search
CPC ... B62D 5/22; B62D 5/30; B62D 7/16; B62D 3/12; F16C 11/0666; F16C 2326/24
See application file for complete search history.

(56) References Cited

U.S. PATENT DOCUMENTS

| | | | | |
|---|---|---|---|---|
| 3,317,253 | A | * | 5/1967 | Ritterskamp ............ B62D 1/16 384/510 |
| 3,788,159 | A | * | 1/1974 | Plant, II ................... B62D 3/12 74/422 |
| 4,454,801 | A | * | 6/1984 | Spann ..................... B62D 5/083 137/625.24 |
| 4,640,148 | A | * | 2/1987 | Hasegawa ............... B62D 3/123 74/422 |
| 4,779,694 | A | * | 10/1988 | Adams .................... B62D 5/087 180/428 |
| 4,924,696 | A | * | 5/1990 | Schroeder ................ B62D 5/22 180/428 |
| 5,021,721 | A | | 6/1991 | Oshita et al. |
| 5,482,132 | A | * | 1/1996 | Birsching ................ B62D 3/12 180/428 |
| 5,655,621 | A | | 8/1997 | Birsching |
| 6,499,753 | B2 | | 12/2002 | Irvine et al. |
| (Continued) | | | | |

*Primary Examiner* — Frank B Vanaman
(74) *Attorney, Agent, or Firm* — Global IP Counselors, LLP (57) ABSTRACT

A vehicle steering assembly that includes a housing, a pinion shaft, a seal, a protector and a dust cover. The housing defines a bore with the pinion shaft extending therethrough. The seal is disposed within the bore spaced apart from the end of the housing. The seal extends around the pinion shaft creating a seal therebetween. The housing and the pinion shaft define an annular space therebetween and between an opening at one end of the housing and the seal. The protector is fitted to the housing covering a portion of the opening and the annular space. The protector has a shaft receiving opening with the pinion shaft extending therethrough and out of the housing. The dust cover is attached to the housing completely covering the protector and the opening of the bore.

8 Claims, 5 Drawing Sheets

(56) References Cited

U.S. PATENT DOCUMENTS

| | | |
|---|---|---|
| 6,942,058 B2 | 9/2005 | Turner et al. |
| 2013/0015013 A1* | 1/2013 | Sunaga .................... B62D 5/06 180/421 |
| 2015/0298728 A1* | 10/2015 | Yoda ...................... H02K 5/173 180/422 |

* cited by examiner

FIG. 11 ic VEHICLE STEERING ASSEMBLY

BACKGROUND

Field of the Invention

The present invention generally relates to vehicle steering assembly. More specifically, the present invention relates to vehicle steering assembly where an annular shaped space in a pinion receiving housing is at least partially filled with a protector member that defines a labyrinth path with a pinion shaft and a dust cover, that limits or restricts movement of debris or dust into the annular shaped space.

Background Information

Vehicle steering assemblies often include an annular shaped space at an upper end of a pinion shaft receiving opening defined within a housing of the vehicle steering assembly. The annular shaped space is usually protected by a dust cover. The annular shaped space is also usually at least partially filled with grease that retains some or all of dust or debris that has passed around the dust cover and into the annular shaped space.

SUMMARY

One object of the present disclosure is to provide a vehicle steering assembly with a disk shaped protector installed within an annular shaped space at one end of a pinion shaft receiving bore of a housing of the vehicle steering assembly such that a dust cover covering the annular shaped space, a pinion shaft within the housing and the disk shaped protector define a labyrinth path that limits movement of dust and/or debris from outside the dust cover into the annular shaped space.

In view of the state of the known technology, one aspect of the present disclosure is to provide a vehicle steering assembly with a housing, a pinion shaft, a seal, a protector and a dust cover. The housing defines a shaft receiving bore with an opening at one end of the housing. The pinion shaft extends through the shaft receiving bore and out the opening of the shaft receiving bore. The seal is disposed within the shaft receiving bore spaced apart from the one end of the housing. The seal is installed to the housing such that the seal extends around the pinion shaft creating a seal between the housing and the pinion shaft. The housing and the pinion shaft define an annular space therebetween and between the opening and the seal. The protector is dimensioned to fit to the housing such that the protector covers a portion of the opening and the annular space. The protector has a shaft receiving opening with the pinion shaft extending therethrough and out of the housing. The dust cover is attached to the housing completely covering the protector and the opening, the dust cover being in contact with an outer surface of the pinion shaft.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
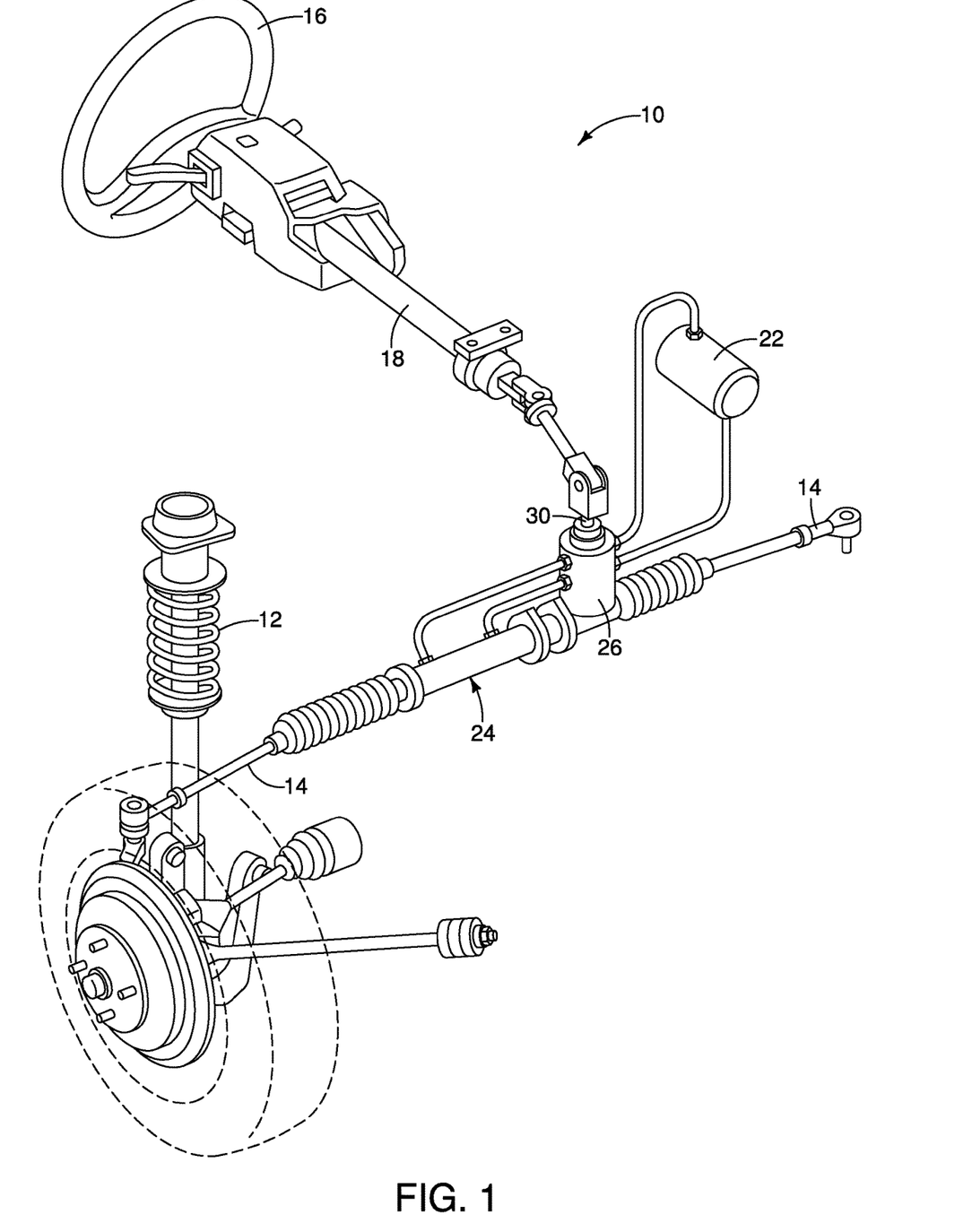
FIG. 1 is a perspective view of a vehicle steering assembly that includes a rack and pinion assembly in accordance with a first embodiment.

Referring initially to FIG. 1, a vehicle steering assembly 10 is schematically illustrated in accordance with a first embodiment.

The vehicle steering assembly 10 (also referred to hereinbelow as the steering assembly 10) includes, among other elements and features, a wheel suspension assembly 12, tie rods 14, steering wheel 16, steering column assembly 18, a power steering pump 22 and a rack and pinion assembly 24. The power steering pump 22 is a hydraulic pump that provides pressurized hydraulic fluid (steering fluid) to the rack and pinion assembly 24 in a conventional manner. Since wheel suspension assemblies, tie rods, steering wheels, steering column assemblies and power steering pumps are conventional vehicle components and features. Therefore, further description of these components and features is omitted for the sake of brevity.

Figure 2:
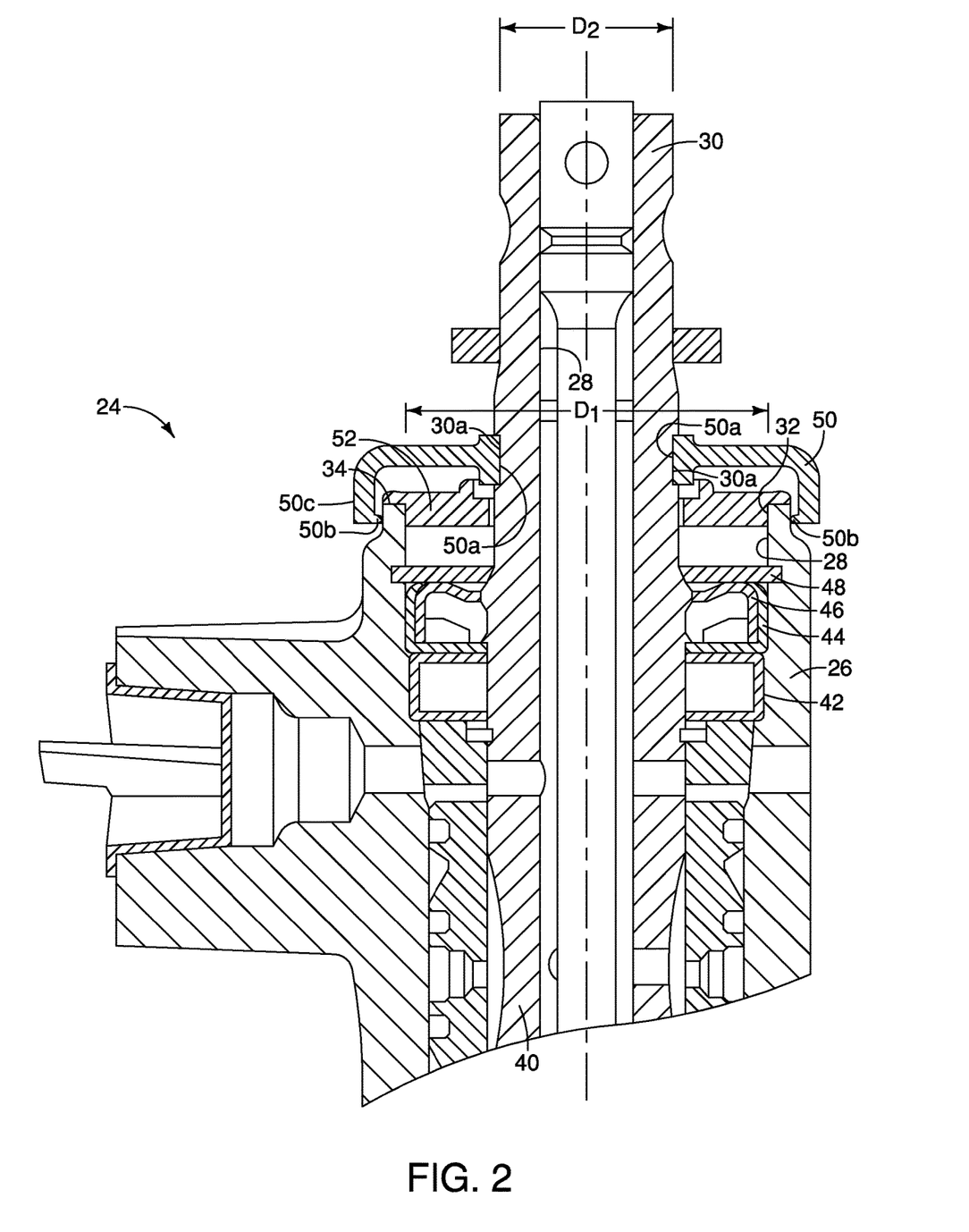
FIG. 2 is a cross-sectional view of a pinion shaft receiving section of a housing of the rack and pinion assembly showing an annular shaped space defined within the housing, with a protector installed to an upper portion of the annular shaped space in accordance with the first embodiment.
Figure 3:
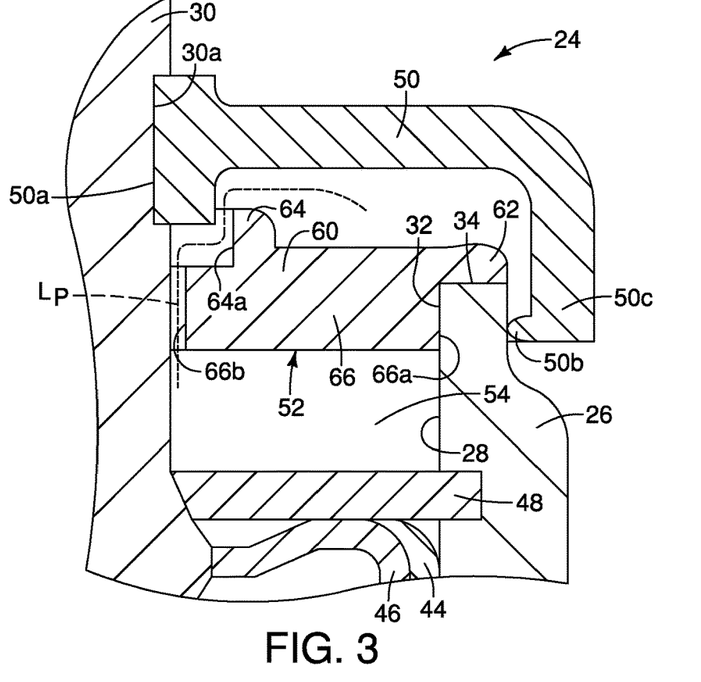
FIG. 3 is another cross-sectional view of the pinion shaft receiving section of the housing of the rack and pinion assembly showing a seal, the pinion shaft, a portion of the annular shaped space defined within the housing, and a portion of the protector installed to the upper portion of the annular shaped space in accordance with the first embodiment.
Figure 4:
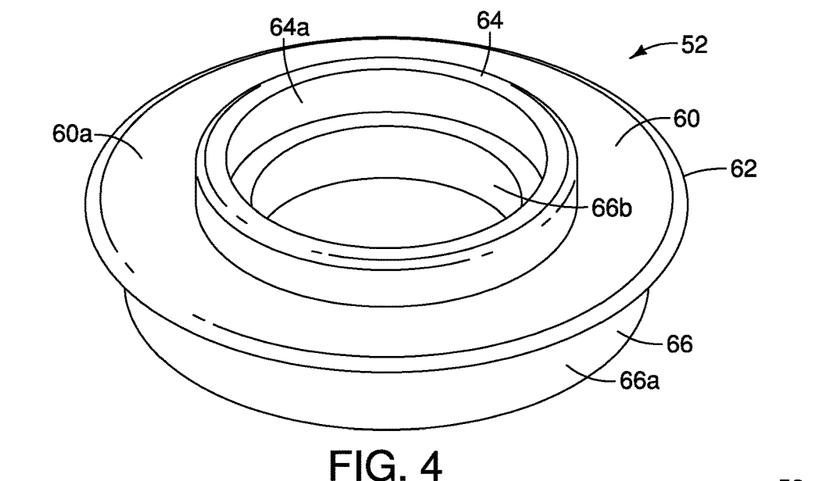
FIG. 4 is a perspective view of the protector removed from the rack and pinion assembly in accordance with the first embodiment.

The rack and pinion assembly 24 includes, among other elements, a steering pinion shaft housing 26 (also referred to hereinbelow as the housing 26) with a shaft receiving bore 28 and a pinion shaft 30, as shown in FIGS. 2-4. The shaft receiving bore 28 has an opening 32 exposing the shaft receiving bore 28. The housing 26 further defines an annular surface 34 that encircles the opening 32. The pinion shaft 30 extends through the shaft receiving bore 28 and out of the opening 32. The pinion shaft 30 is connected to the steering column assembly 18 and the steering wheel 16 such that when the steering wheel 16 is turned, the rack and pinion assembly 24 causes the front wheels of a vehicle having the vehicle steering assembly 10 to turn, thereby steering the vehicle in a conventional manner. Since other elements of the rack and pinion assembly 24 both internal and external are conventional features, further description is omitted for the sake of brevity.

As shown in FIGS. 2 and 3, the shaft receiving bore 28 has a first diameter $D_1$ and the pinion shaft 30 has a second diameter $D_2$ with the second diameter $D_2$ being larger than the first diameter $D_1$.

As shown in FIG. 2, the shaft receiving bore 28 includes power steering elements 40, a spacer 42 (or bearing), seal members 44 and 46, a C-clip 48, a dust cover 50 and a protector 52.

The seal members 44 and 46 (herein after referred to as the seal 46) are disposed within the shaft receiving bore 28 and are spaced apart from the annular surface 34 that encircles the opening 30 (the opening 30 and the annular surface 34 defining an upper end of the housing 26). In other words, the seal 46 is installed to the housing 26 such that the seal 46 extends around the pinion shaft 30 creating a seal between the housing 26 and the pinion shaft 30.

The dust cover 50 has an annular surface 50a that defines a central opening of the dust cover 50. The pinion shaft 30 extends through the central opening of the dust cover 50 such that the annual surface 50a is retained within a recess 30a defined on an outer surface of the pinion shaft 30, as shown in FIGS. 2 and 3. The dust cover 50 also includes an inwardly extending annular projection 50b formed along an outer cup-like area 50c of the dust cover 50. The power steering elements 40, the spacer 42, the seal members 44 and 46, the C-clip 48 and the dust cover 50 are conventional elements of rack and pinion assemblies. Therefore, further description of these elements is omitted for the sake of brevity.

As shown in FIGS. 2 and 3, an annular shaped space 54 is defined above the C-clip 48 (and seal 46) and below annular surface 34. In the first embodiment depicted in FIGS. 2-5, a portion of the protector 52 is dimensioned to extend into the annular shaped space 54. Typically, the annular shaped space 54 is at least partially filled with a grease material that retains any dust and/or debris that might make its way into the annular shaped space 54.

Figure 5:
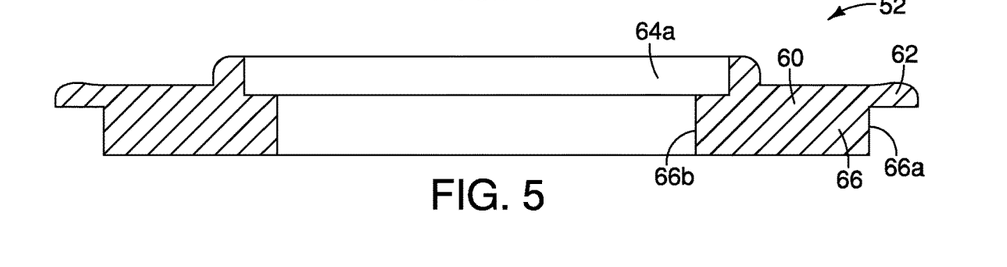
FIG. 5 is a cross-sectional view of the protector in accordance with the first embodiment.

A description of the protector 52 is now provided with reference to FIGS. 3, 4 and 5. The protector 52 has an overall disk or annular shape. The protector 52 basically includes a main portion 60, a lip portion 62, an annular projection 64 and a lower block portion 66.

The main portion 60 has a generally flat upper surface 60a and has an overall annular disk shape. The lip portion 62 is defined along an outer periphery of the main portion 60 and extends radially outward from the lower block portion 66. Specifically, the lip portion 62 extends radially outward from a cylindrically shaped outer surface 66a of the lower block portion 66. The lip portion 62 is dimensioned to contact, overlay and cover the annular end surface 34 of the housing 26.

The protector 52, including the main portion 60, the lip portion 62, the annular projection 64 and the lower block portion 66, are all formed internally as a single, uniform monolithic element. For example, the protector 52 can be molded or 3-D printed as a single element with all the features depicted in FIGS. 4 and 5.

The lower block portion 66 has an overall annular disk shape. with a cylindrically shaped outer surface 66a that engages a surface of the shaft receiving bore 32 adjacent to the opening 32. The lower block portion 66 also include an inner surface 66b that has an annular shape and encircles the pinion shaft 30. Further, the inner surface 66b essentially defines a central opening of the protector 52 with the pinion shaft 30 extending therethrough. The inner surface 66b is spaced apart from the pinion shaft 30.

The lower block portion 66 extends into the opening 32 of the housing 26 filling a portion of the annular space 54 within the housing 26. The lower block portion 66 fills at least 20% of annular space 54 in the first embodiment, as depicted in FIGS. 2-5. However, the overall size of the lower block portion 66 of the first embodiment can be modified to increase or decrease the amount of volume of the annular space 54 that is filled with the lower block portion 66. Such changes in the sized of the lower block portion 66 depend upon the overall design of the housing 26 and the size of the annular space 54. Consequently, the lower block portion 66 can fill anywhere between 1% to 80% of the annular space 54, or 20% to 60% of the volume of the annular space 54 of the housing 26.

The annular projection 64 extends from the upper surface 60a of the main portion 60, and, with the protector 52 and the dust cover 50 installed to the housing 26, the annular projection 64 extends upward toward the dust cover 50. However, the annular projection 64 is spaced apart from the dust cover 50 when installed to the housing 26.

A labyrinth-shaped path $L_P$ is defined beginning above the C-clip 48 and the dust cover 50. More specifically, the labyrinth-shaped path $L_P$ that extends from the annular space 54 through an annular space between the pinion shaft 30 and the inner surface 66b of the protector 52, an radially outward over the annular projection 64 (between the dust cover 50 and the annular projection 64) and further radially from the annular projection 64 to space between the dust cover 50 and the upper surface 60a of the main portion 60 of the protector 52. Looking at it from a different perspective, the labyrinth-shaped path $L_P$ extends from the annular surface 34 (an outermost surface of the housing 26) to the pinion shaft 30 and down the pinion shaft 30 to the annular shaped space 54 beneath the protector 52 within the dust cover 50.

The protector 52 is not a seal per se. Rather the protector 52 covers a majority of the opening 32 of the housing 26, defining a gap (part of the labyrinth-shaped path $L_P$) between the pinion shaft 30 and inner surface 66b of the protector 52. The protector 52 is configured to limit, and possibly eliminate debris that may enter space under the dust cover 50 and make its way to the annular shaped space 54 within the housing 26.

Due to various driving conditions, changes in ambient temperature and changes in ambient air pressure, the dust cover 50 typically flexes. Such flexing can cause dust and/or other debris to enter the space under the dust cover 50 from between the dust cover 50 and the housing 26 and/or between the dust cover 50 and the pinion shaft 30.

The protector 52 is dimensioned to fit to the housing 26 such that the protector 52 covers a portion of the opening 32, thereby at least partially covering a majority of the annular shaped space 54. Further, the inner surface 66b of the lower block portion 66 of the protector 52 defines a shaft receiving opening with the pinion shaft 30 extending therethrough and out of the housing 26. Therefore, the protector 52 has a non-contacting relationship with the pinion shaft 30.

The dust cover 50, on the other hand, is attached to the housing 26 and completely covers the protector 26 and the opening 32 of the housing 26. Further, the dust cover 50 is in direct contact with the outer surface of the pinion shaft 30 within the recess 30a.

Second Embodiment

Figure 6:
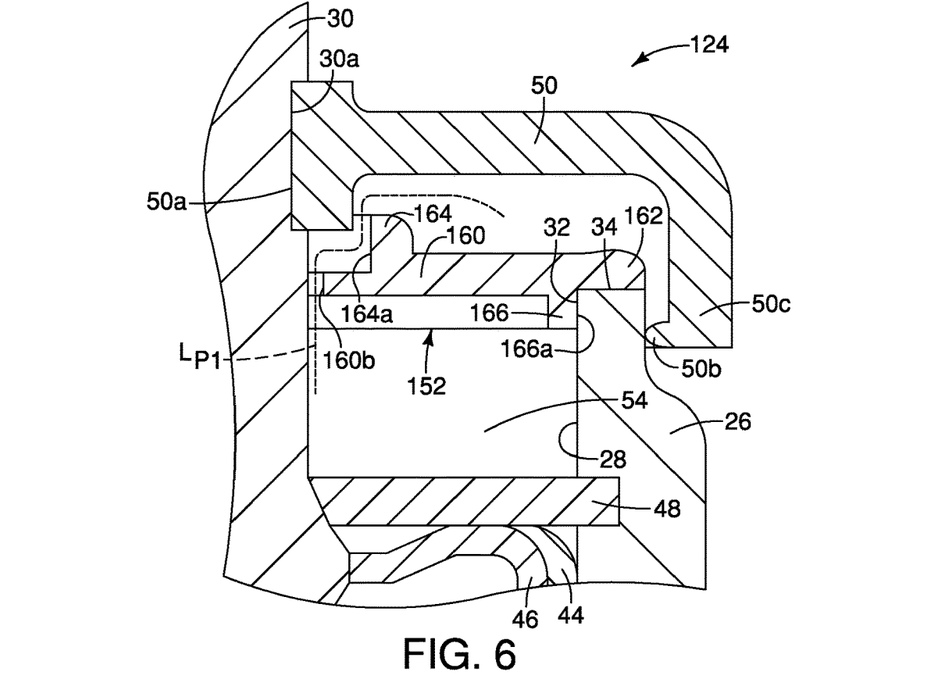
FIG. 6 is a cross-sectional view of the pinion shaft receiving section of the housing of the rack and pinion assembly showing the seal, the pinion shaft, a portion of the annular shaped space defined within the housing, and a portion of a protector installed to the upper portion of the annular shaped space in accordance with a second embodiment.
Figure 7:
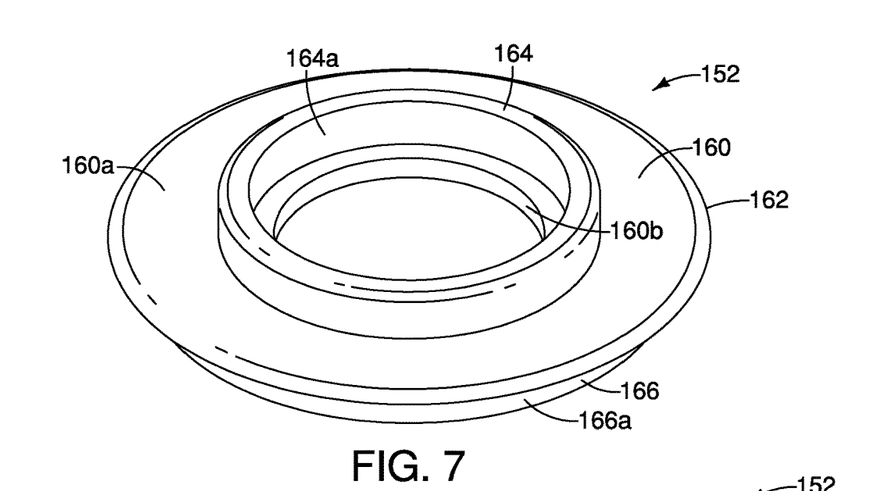
FIG. 7 is a perspective view of the protector removed from the rack and pinion assembly in accordance with the second embodiment.
Figure 8:
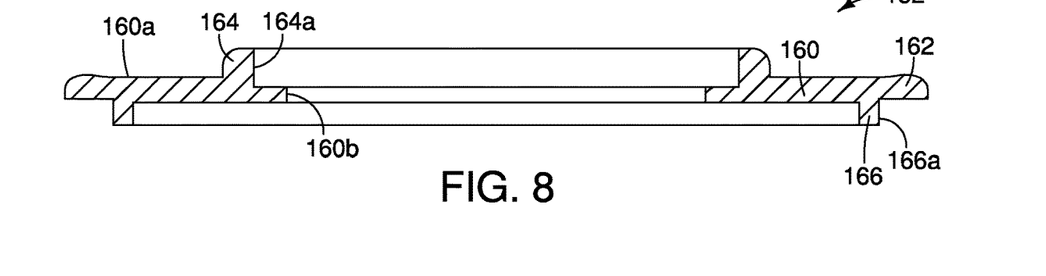
FIG. 8 is a cross-sectional view of the protector in accordance with the second embodiment.

Referring now to FIGS. 6-8, a protector 152 of the housing 26 of a rack and pinion assembly 124 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The rack and pinion assembly 124 of the second embodiment is identical to the rack and pinion assembly 24 of the first embodiment, except that the protector 52 has been replaced with the protector 152. The protector 152 has been modified as compared to the protector 52 of the first embodiment.

The protector 152 has an overall disk or annular shape. Similar to the protector 52 of the first embodiment, the protector 152 of the second embodiment basically includes a main portion 160, a lip portion 162, an annular projection 164 and a lower block portion 166.

The main portion 160 has a generally flat upper surface 160a and has an overall annular disk shape. The lip portion 162 is defined along an outer periphery of the main portion 160 and extends radially outward from the lower block portion 166. Specifically, the lip portion 162 extends radially outward from a cylindrically shaped outer surface 166a of the lower block portion 166. The lip portion 162 is dimensioned to contact, overlay and cover the annular end surface 34 of the housing 26.

The protector 152 is basically the same as the protector 52 of the first embodiment, except for the overall shape of the lower block portion 166. In the second embodiment, the lower block portion 166 is basically an annular shaped projection that extends downward from the lip portion 162, defining a cylindrically shaped outer surface 166a.

Consequently, the lower block portion 166 does not fill as much of the annular shaped space 54 as the lower block portion 66 of the first embodiment. In the second embodiment, the lower block portion 166 fills only about 2-5% of the overall volume of the annular shaped space 54. As in the first embodiment, the pinion shaft 30, the protector 152 and the dust cover 50 define a labyrinth path $L_{P1}$ that provides the same benefits described above with respect to the labyrinth path $L_P$.

Third Embodiment

Figure 9:
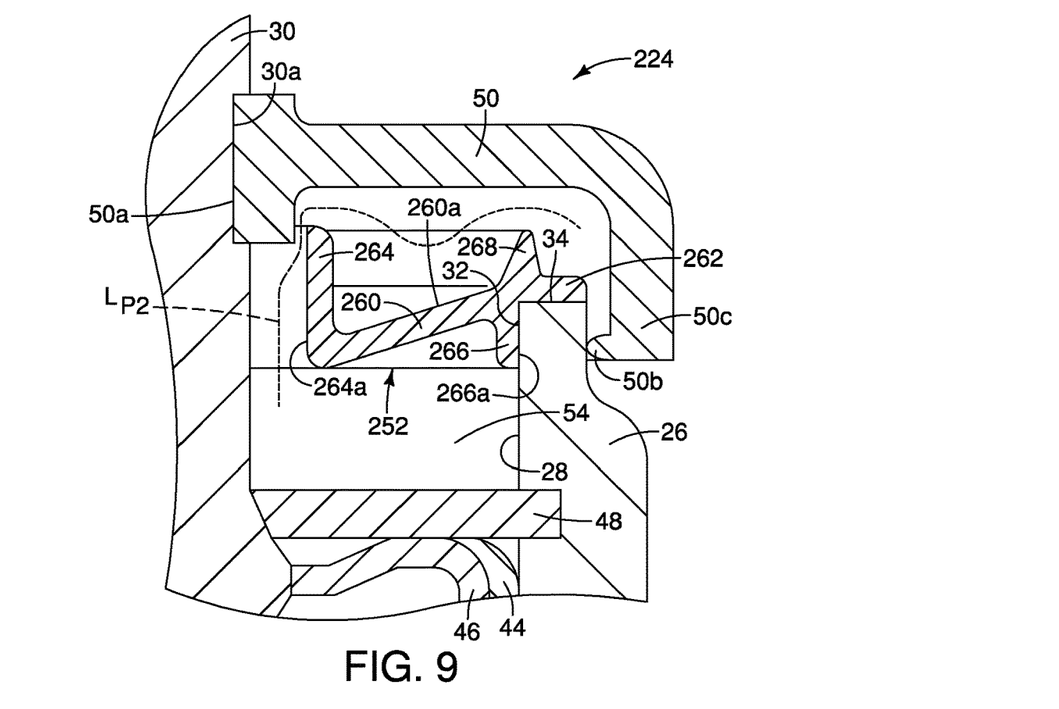
FIG. 9 is a cross-sectional view of the pinion shaft receiving section of the housing of the rack and pinion assembly showing a seal, the pinion shaft, a portion of the annular shaped space defined within the housing, and a portion of a protector installed to the upper portion of the annular shaped space in accordance with a third embodiment.
Figure 10:
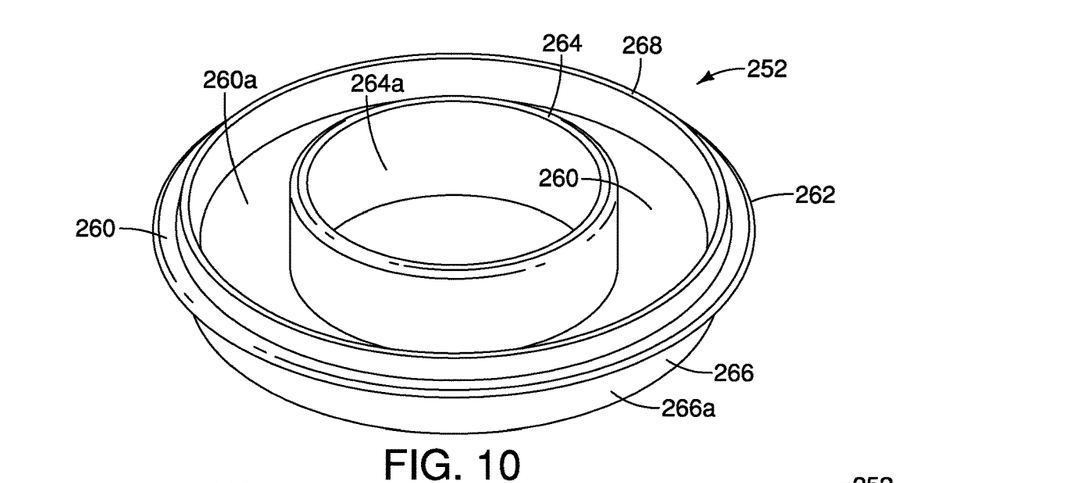
FIG. 10 is a perspective view of the protector removed from the rack and pinion assembly in accordance with the third embodiment.
Figure 11:
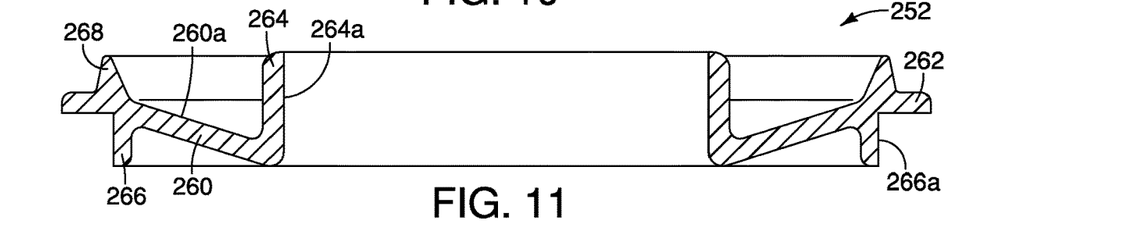
FIG. 11 is a cross-sectional view of the protector in accordance with the third embodiment.

Referring now to FIGS. 9-11, a protector 252 of the housing 26 of the rack and pinion assembly 224 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The rack and pinion assembly 224 of the third embodiment is identical to the rack and pinion assembly 24 of the first embodiment, except that the protector 52 has been replaced with the protector 252. The protector 252 has been modified as compared to the protector 52 of the first embodiment.

The protector 252 has an overall disk or annular shape. Similar to the protector 52 of the first embodiment, the protector 252 of the third embodiment basically includes a main portion 260, a lip portion 262, a first annular projection 264, a lower block portion 266 and a second annular projection 268.

The main portion 260 has a conical surface 260a and also has an overall annular disk shape. Specifically, the main portion 260 is inclined downward as viewed in cross-section in FIGS. 9 and 11. Specifically, the conical surface 260a has a radially outward end at the second annular projection 268 that is vertically higher than a radially inward end at the first annular projection 264, as viewed in cross-section.

The lip portion 262 is defined along an outer periphery of the main portion 260 and extends radially outward from the lower block portion 266. Specifically, the lip portion 262 extends radially outward from a cylindrically shaped outer surface 266a of the lower block portion 266. The lip portion 262 is dimensioned to contact, overlay and cover the annular end surface 34 of the housing 26.

The first annular projection 264 extends upward from the main portion 260 and includes an inner surface 264a that defines a central opening of the protector 252 with the pinion shaft 30 extending therethrough (non-contacting).

The lower block portion 266 of the protector 252 is basically an annular shaped projection that extends downward from the lip portion 262, defining a cylindrically shaped outer surface 266a. The second annular projection 268 extends upward from the main portion 260 adjacent to the lip portion 262.

In the third embodiment, the main portion 260 extends downward moving in an inner direction from the second annular projection 268. Therefore, almost all of the main portion 260 extends downward into the annular shaped space 54. Consequently, the lower block portion 266 and the main portion 260 together fill between approximately 5% to 10% of the overall volume of the annular shaped space 54.

As in the first embodiment, the pinion shaft 30, the protector 252 and the dust cover 50 define a labyrinth path $L_{P2}$ that provides the same benefits described above with respect to the labyrinth path $L_P$. However, in the third embodiment, the second annular projection 268 adds an additional serpentine section to the labyrinth path $L_{P2}$, as comparted to either of the labyrinth path $L_P$ of the first embodiment or the labyrinth path $L_{P1}$.

The various elements and components of the vehicle steering assembly 10, other than the three embodiments of the protector 52, 152 and 252, are conventional components that are well known in the art. Since such steering elements and components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle steering assembly. Accordingly, these terms, as utilized to describe the present invention should be interpreted relative to a vehicle equipped with the vehicle steering assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle steering assembly, comprising:
   a housing defining a shaft receiving bore with an opening at one end of the housing;
   a pinion shaft extending through the shaft receiving bore, the pinion shaft extending out the opening of the shaft receiving bore;
   a seal disposed within the shaft receiving bore spaced apart from the one end of the housing, the seal being installed to the housing such that the seal extending around the pinion shaft creating a seal between the housing and the pinion shaft, the housing and the pinion shaft defining an annular space therebetween and between the opening and the seal;
   a protector dimensioned to fit to the housing such that the protector covers a portion of the opening and the annular space, the protector having a shaft receiving opening with the shaft extending through the shaft receiving opening and out of the housing; and
   a dust cover attached to the housing completely covering the protector and the opening, the dust cover being in contact with an outer surface of the pinion shaft, the protector having an annular shape with a cylindrically shaped outer surface that engages a surface of the shaft receiving bore adjacent to the opening, and the protector having a lip portion that extends radially outward from the cylindrically shaped outer surface, the lip portion being dimensioned to cover an annular end surface of the housing.

2. The vehicle steering assembly according to claim 1, wherein
   the protector includes a lower block portion that extends into the opening of the housing filling a portion of the annular space, the lower block portion filling at least 20% of annular space.

3. The vehicle steering assembly according to claim 2, wherein
   the lower block portion filling between 20% and 60% of the annular space.

4. The vehicle steering assembly according to claim 3, wherein
   the protector has a non-contacting relationship with the pinion shaft.

5. A vehicle steering assembly, comprising:
   a housing defining a shaft receiving bore with an opening at one end of the housing;
   a pinion shaft extending through the shaft receiving bore, the pinion shaft extending out the opening of the shaft receiving bore;
   a seal disposed within the shaft receiving bore spaced apart from the one end of the housing, the seal being installed to the housing such that the seal extending around the pinion shaft creating a seal between the housing and the pinion shaft, the housing and the pinion shaft defining an annular space therebetween and between the opening and the seal;
   a protector dimensioned to fit to the housing such that the protector covers a portion of the opening and the annular space, the protector having a shaft receiving opening with the shaft extending through the shaft receiving opening and out of the housing; and
   a dust cover attached to the housing completely covering the protector and the opening, the dust cover being in contact with an outer surface of the pinion shaft, the protector including an annular projection extending from an upper surface of the protector toward the dust cover, the protector has a non-contacting relationship with the pinion shaft, and, the annular projection, the upper surface of the protector and a surface of the dust cover facing the protector define a labyrinth-shaped path that extends from an outermost surface of the housing to the pinion shaft within the dust cover.

6. A vehicle steering assembly, comprising:
   a housing defining a shaft receiving bore with an opening at one end of the housing;
   a pinion shaft extending through the shaft receiving bore, the pinion shaft extending out the opening of the shaft receiving bore;
   a seal disposed within the shaft receiving bore spaced apart from the one end of the housing, the seal being installed to the housing such that the seal extending around the pinion shaft creating a seal between the housing and the pinion shaft, the housing and the pinion shaft defining an annular space therebetween and between the opening and the seal;
   a protector dimensioned to fit to the housing such that the protector covers a portion of the opening and the annular space, the protector having a shaft receiving opening with the shaft extending through the shaft receiving opening and out of the housing; and a dust cover attached to the housing completely covering the protector and the opening, the dust cover being in contact with an outer surface of the pinion shaft, the protector including a first annular projection extending from an upper surface of the protector toward a radially outer portion of the dust cover, and a second annular projection extending from the upper surface of the protector toward a radially inner portion of the dust cover, the second annular projection being spaced apart from the pinion shaft.

7. The vehicle steering assembly according to claim 6, wherein the protector has a non-contacting relationship with the pinion shaft.

8. The vehicle steering assembly according to claim 7, wherein the first annular projection, the second annular projection, the upper surface of the protector and a surface of the dust cover facing the protector define a labyrinth-shaped path that extends from an outermost surface of the housing to the pinion shaft within the dust cover.

* * * * *